US008861832B2

(12) United States Patent
Inoue et al.

(10) Patent No.: US 8,861,832 B2
(45) Date of Patent: Oct. 14, 2014

(54) INSPECTION SYSTEM AND METHOD

(71) Applicant: NuFlare Technology, Inc., Numazu (JP)

(72) Inventors: Takafumi Inoue, Kanagawa (JP); Eiji Matsumoto, Kanagawa (JP); Nobutaka Kikuiri, Tokyo (JP); Ikunao Isomura, Kanagawa (JP)

(73) Assignee: NuFlare Technology, Inc., Numazu-shi (JP)

( * ) Notice: Subject to any disclaimer, the term of this patent is extended or adjusted under 35 U.S.C. 154(b) by 69 days.

(21) Appl. No.: 13/768,392

(22) Filed: Feb. 15, 2013

(65) Prior Publication Data

US 2013/0216120 A1    Aug. 22, 2013

(30) Foreign Application Priority Data

Feb. 17, 2012  (JP) ................................. 2012-032506

(51) Int. Cl.
*G06K 9/00* (2006.01)
*G06T 7/00* (2006.01)

(52) U.S. Cl.
CPC ..... *G06T 7/0004* (2013.01); *G06T 2207/30148* (2013.01); *G06T 2207/20021* (2013.01); *G06T 7/001* (2013.01)
USPC ......... 382/144; 257/E21.023; 716/51; 716/52

(58) Field of Classification Search
CPC ....................................................... G06T 7/00
USPC ............. 216/12; 257/435, E21.023; 382/144; 438/531; 716/30, 50, 51, 112, 115, 116
See application file for complete search history.

(56) References Cited

U.S. PATENT DOCUMENTS

| | | | |
|---|---|---|---|
| 2011/0044529 A1 | 2/2011 | Tsuchiya et al. | |
| 2011/0176719 A1 | 7/2011 | Inoue et al. | |
| 2012/0081538 A1 | 4/2012 | Ogawa et al. | |
| 2012/0140060 A1 | 6/2012 | Tsuchiya et al. | |
| 2012/0307043 A1 | 12/2012 | Akiyama et al. | |
| 2013/0044205 A1 | 2/2013 | Matsumoto et al. | |
| 2013/0250095 A1* | 9/2013 | Inoue et al. ..................... 348/94 |

FOREIGN PATENT DOCUMENTS

| | | | | |
|---|---|---|---|---|
| JP | 2001-281160 A | 10/2001 | | |
| JP | 2008-112178 | 5/2008 | | |
| JP | 2008112178 A | * 5/2008 | ............... | G03F 1/08 |
| JP | 2010-97168 A | 4/2010 | | |
| JP | 2010097168 A | * 4/2010 | ............... | G03F 1/08 |

OTHER PUBLICATIONS

U.S. Appl. No. 13/792,364, filed Mar. 11, 2013, Inoue, et al.

* cited by examiner

*Primary Examiner* — Gregory F Cunningham
(74) *Attorney, Agent, or Firm* — Oblon, Spivak, McClelland, Maier & Neustadt, L.L.P.

(57) ABSTRACT

An inspection region of a mask is virtually divided by stripes, and a pattern on a position error correcting unit is also virtually divided by stripes. Then, a stage is moved such that all the stripes of both the mask and the position error correcting unit are continuously scanned, so that optical images of these stripes are acquired. Fluctuation values of position coordinates of the patterns formed on the position error correcting unit are acquired from the optical images of the position error correcting unit. Based upon the fluctuation values, fluctuation values of the position coordinates of the respective patterns in the inspection region of the mask are obtained so that the position coordinates are corrected. Thereafter, a map is generated from the fluctuation values of the position coordinates of the respective patterns in the inspection region of the mask.

5 Claims, 6 Drawing Sheets

INSPECTION SYSTEM AND METHOD

CROSS-REFERENCE TO THE RELATED APPLICATION

The entire disclosure of the Japanese Patent Application No. 2012-032506, filed on Feb. 17, 2012 including specification, claims, drawings, and summary, on which the Convention priority of the present application is based, are incorporated herein in its entirety.

FIELD OF THE INVENTION

The present invention relates to an inspection system and inspection method used to detect defects of a pattern formed on an object to be inspected, such as a mask.

BACKGROUND

In recent years, as the levels of integration and capacity of large scale integrated circuits (LSIs) have increased, there has been a need to continue to reduce the width of the circuit patterns of semiconductor devices. Semiconductor devices are manufactured by a reduced projection exposure apparatus called a "stepper" using original artwork patterns with a circuit pattern formed thereon, these are called masks or reticles (hereinafter referred to collectively as masks). Here, a wavelength of deep ultraviolet rays used for the transfer of a pattern is 193 nm, but the size of a pattern to be transferred is shorter than the wavelength. Therefore, the complexity of the lithography technique is also accelerated. Further, the degree of freedom to perform a design change to a different mask pattern for each product is also demanded for mass production of LSIs. In view of these circumstances, an electron beam lithography technique implemented in an electron beam writing apparatus is used when original artwork patterns are formed on a mask.

Electron beam lithography inherently provides a superior resolution, since it uses electron beams, which are a type of charged particle beam. This technology is also advantageous in that great depth of focus is obtained, which enables dimensional variations to be reduced even when a large step feature is encountered. Therefore, the electron beam lithography technique is used not only in manufacturing masks but also when patterns are written directly on a wafer. For example, the technology has been applied to the development of state-of-the-art devices typified by DRAM (dynamic random access memory), as well as to the production of some ASICs.

Incidentally, since the cost to manufacture LSIs is very high, an increase in yield is required to make the manufacturing economically feasible. Therefore, various measures have been adopted in order to increase the yield. In particular, since pattern defects of masks are a large factor in causing yield reduction, the pattern detects are required to be detected accurately in the mask manufacturing process.

However, the dimensions of the patterns for LSI devices, as typified by 1-gigabit class DRAMs, are about to be scaled down from the order of submicrons to the order of nanometers. Therefore, the size of pattern defects to be detected on the mask is very small. As a result, high inspection accuracy is required of inspection systems for detecting defects of masks used in LSI manufacture.

There are two known mask defect detecting methods: the die-to-die inspection method and the die-to-database inspection method. Both the inspections are configured so as to compare an optical image of a sample to be inspected with a reference image serving as an example to detect a defect. For example, in the die-to-database inspection, write data (design pattern data) is inputted into an inspection system and design image data (reference image) serving as the reference image is generated based upon the write data. Measurement data (optical image) obtained by photographing a pattern is compared with the design image data (reference image). Incidentally, the write data is obtained by converting CAD (Computer Aided Design) data that has been pattern-designed into a format, which can be inputted into the inspection system.

The die-to-database inspection method is specifically disclosed in Japanese Laid-Open Patent Publication No. 2008-112178. In this document light is emitted from a light source, and the mask to be inspected is irradiated with this light through an optical unit. The mask is mounted on a stage, and this stage is moved so that the emitted beam of light scans the surface of the mask. Light transmitted through or reflected from the mask reaches an image sensor forming an image thereon. The optical image thus formed on the image sensor is sent to a comparing unit as measurement data. The comparing unit compares the measurement data with design image data in accordance with an appropriate algorithm, and if they are not identical, the mask is determined to have a defect.

As described above, according to the decrease in dimensions of a pattern on a mask, a size of a defect to be detected becomes smaller. Therefore, the inspection system is required to have an optical unit with a high magnification, and the time for inspection becomes protracted. Therefore, due to thermal drift of a mask or fluctuation of air flow inside the inspection system caused by long-time irradiation of an inspection light to the mask, measurement errors of a position measuring system caused by various heat sources in the inspection system and the like, there is a problem in that fluctuation of the position of the pattern obtained from the inspection result occurs. In view of further advancement of decreases in pattern dimensions, such a position fluctuation must be corrected.

The present invention has been conceived in view of the above problem. Therefore, an object of the invention is to provide a apparatus and method which can reduce position errors occurring in the inspection process.

Other challenges and advantages of the present invention are apparent from the following description.

SUMMARY OF THE INVENTION

According to one embodiment of the present invention, an inspection system comprising, a stage having a region for placing a sample thereon which has an inspection region virtually divided by a plurality of stripes, a position error correcting unit, which is disposed on the stage in a region different from the region for placing the sample, configured to have patterns virtually divided corresponding to the plurality of stripes, an optical image acquiring unit configured to irradiate light onto the inspection region of the sample and onto the position error correcting unit, thereby obtaining optical images, a reference image producing unit configured to generate reference images from design data of the sample, a comparing unit configured to compare the optical images of the sample and the reference images of the sample, and determine that a different value is defective when the difference value by comparison with the optical image and the reference image exceeds a predetermined threshold, a fluctuation value acquiring unit configured to acquire fluctuation values of position coordinates of the patterns formed on the position error correcting unit from both the optical image of the position error correcting unit and the reference image of the position error correcting unit, and a fluctuation value correcting unit configured to obtain, based upon the fluctuation values, fluctuation values of position coordinates of respective patterns on the inspection region of the sample to be inspected, and to correct the position coordinates of the respective patterns.

According to another aspect of this embodiment of the present invention, an inspection system further comprising a map producing unit for producing a map from the position coordinates of the respective patterns in the inspection region of the sample to be inspected.

According to another embodiment of the present invention, an inspection method comprising; a step of placing a sample to be inspected on a stage on which a position error correcting unit having predetermined patterns is disposed, a step of virtually dividing an inspection region of the sample to be inspected by a plurality of stripes and virtually dividing the patterns of the position error correcting unit by a plurality of stripes, and moving the stage such that all the stripes are continuously scanned regarding both the sample to be inspected and the position error correcting unit to acquire optical images of the sample to be inspected and the position error correcting unit, a step of producing reference images corresponding to the optical images from design data of the sample to be inspected, a step of comparing the optical image of the sample to be inspected and the reference image of the sample to be inspected with each other and making a defect judgment when a difference value between both exceeds a predetermined threshold, a step of acquiring fluctuation values of position coordinates of the patterns formed on the position error correcting unit from the optical image of the position error correcting unit and the reference image of the position error correcting unit, a step of obtaining, based upon the fluctuation values, fluctuation values of position coordinates of respective patterns in the inspection region of the sample to be inspected to correct the position coordinates, and a step of producing a map from the fluctuation values of the position coordinates of the respective patterns in the inspection region of the sample to be inspected.

According to another aspect of this embodiment, an inspection method wherein the step of acquiring fluctuation values of position coordinates of the patterns formed on the position error correcting unit from the optical image of the position error correcting unit and the reference image of the position error correcting unit comprises; a step of obtaining, from true values of the position coordinates of the patterns formed on the position error correcting unit, an average value of the true values of the patterns contained in a predetermined region, a step of obtaining actually-measured values of the position coordinates of the patterns formed on the position error correcting unit from the optical image of the position error correcting unit and the reference image of the position error correcting unit and obtaining an average value of actually-measured values of the patterns contained in the predetermined region, and a step of acquiring fluctuation values of the position coordinates of the patterns formed on the position error correcting unit from a difference between the average value of the true values and the average value of the actually-measured values.

According to another aspect of this embodiment, an inspection method, wherein a white pattern is formed on the position error correcting unit, and the step of obtaining the optical images consists of irradiating the sample to be inspected and the position error correcting unit with light to focus respective images of the sample to be inspected and the position error correcting unit on an image sensor through an optical unit, and comprises a step of obtaining a light amount of an optical image focused on the image sensor from an optical image of the white pattern, and a step of performing calibration of the light amount when the light amount lowers from a predetermined value.

DETAILED DESCRIPTION OF THE EMBODIMENTS

Embodiment 1

An inspection system according to the present embodiment, includes a stage on which a sample to be inspected is placed. A position error correcting unit on which the predetermined pattern is formed, is provided on the stage. An inspection region of the sample is virtually divided by a plurality of stripes, and the pattern of the position error correcting unit is also virtually divided by these stripes. The position errors of the patterns occurring in the inspection process can be detected by the position error correcting unit. The inspection system and method according to the present embodiment will be described in further detail below.

In the present embodiment, the sample to be inspected is a mask, however it is not limited to this.

The stage according to the present embodiment is a XYθ stage provided to be movable in two horizontal directions by X- and Y-axis motors and rotatable in a horizontal plane by a θ-axis motor. The mask is mounted at a predetermined position on the XYθ stage.

When the inspection is performed, the pattern formed on the mask is irradiated with light emitted from the light source disposed above the XYθ stage. The light transmitted through the mask reaches the photodiode array, thereby forming an optical image thereon. The pattern image formed on the photodiode array is photoelectrically converted by the photodiode array, and then A/D (analog to digital) converted by the sensor circuit into a optical image. Next, the optical image is output to the comparing circuit.

Figure 1:
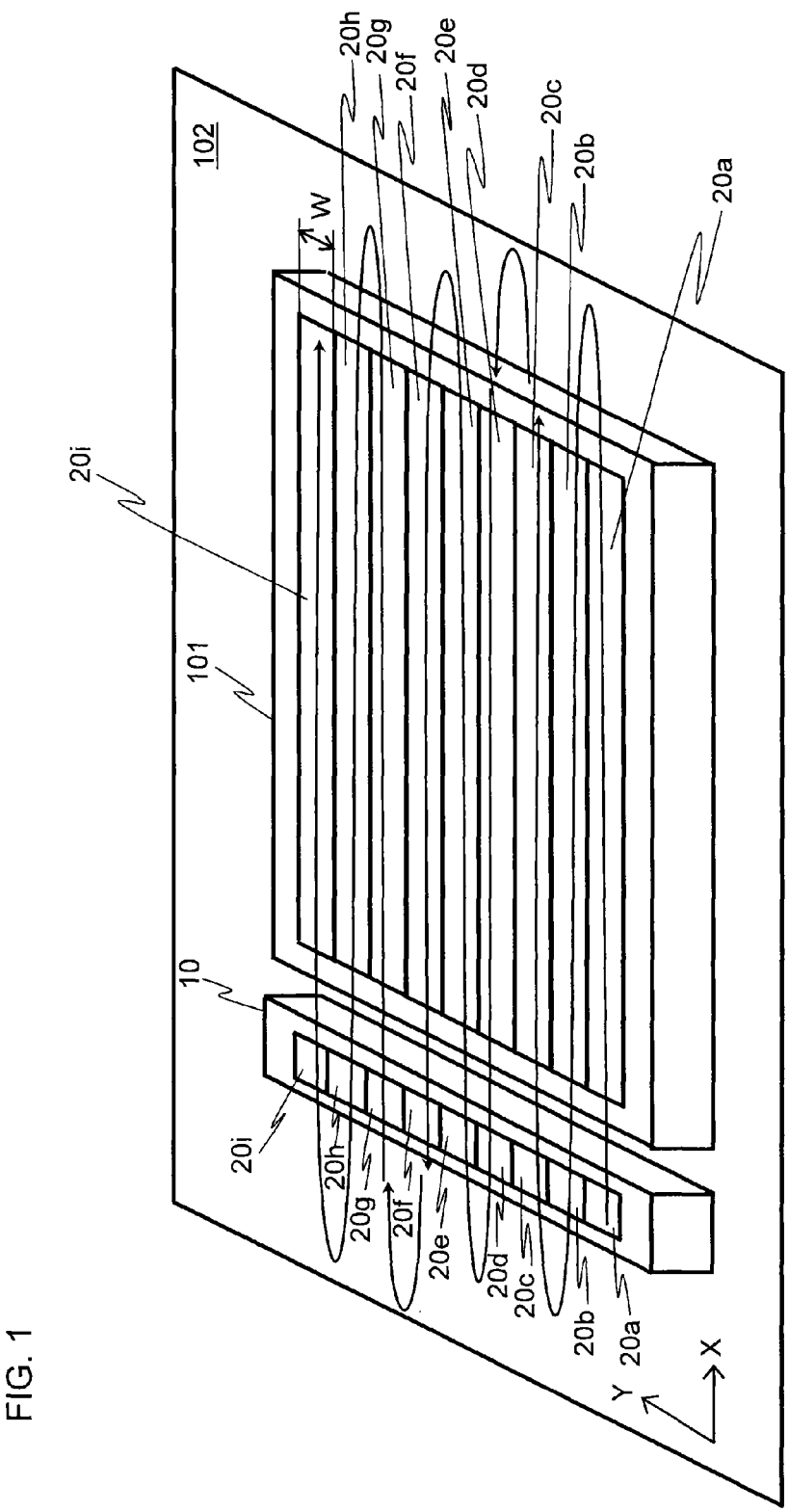
FIG. 1 is a diagram illustrating the way in which an optical image is acquired according to embodiment 1.

FIG. 1 is a diagram illustrating the way in which an optical image is acquired. As shown in FIG. 1, a sample to be inspected, in this case a mask 101, is mounted on the stage 102.

The inspection area on the mask 101 is divided into a plurality of strip-shaped stripes by imaginary lines running along the X direction, where the width of each stripe in the Y direction is equal to the scan width W. The inspection area is divided into nine stripes corresponding to the first stripe 20a, to the ninth stripe 20i as shown in FIG. 1. The movement of the stage 102 is controlled so that each stripe is continuously scanned. Thereby an image (of each inspection stripe 20) having a width corresponding to the scan width W is continuously input to the photodiode array, and then the optical image is generated.

Specifically, an image of the first stripe 20a is inputted into the photodiode array while the stage 102 is moving in the −X direction. Next, while the stage 102 is moving in the X direction, an image with a scan width W regarding the second stripe 20b is similarly inputted into the photodiode array continuously. Regarding the third stripe 20c, an image is inputted into the photodiode array while the stage 102 is moving in a direction opposite to the direction (X direction) acquiring the image of the second stripe 20b, namely, in the direction (−X direction) acquiring the image of the first stripe 20a. In the subsequent steps, images of all the stripes are similarly inputted in the photodiode array. The images are sequentially input into the photodiode array in this manner, so that efficient acquirement of the optical image is possible.

In this embodiment, a position error correcting unit 10 is provided on the stage 102. A pattern is formed on a surface of the position error correcting unit 10. The pattern may be, for example, a pattern composed of a plurality of cross-shaped patterns, a pattern composed of a plurality of line patterns, a pattern composed of a plurality of contact holes, or the like. Positions of respective patterns, namely, X coordinates and Y coordinates, can be grasped in a measuring step other than an inspecting step of the mask 101. The measuring step is not affected by fluctuation of heat or air flow which may occur at the inspecting step. In this embodiment, a position coordinate obtained by such a measuring step is called the "true value of a pattern position coordinate in a position error correcting unit". Incidentally, for measurement of the true value, a coordinate measuring apparatus such as Model "LMS-IPRO" manufactured by LEICA CAMERA AG, or the like can be used. The number of times of measurement of the true value to be performed may be one in principle, and it is unnecessary to perform the measurement for each inspection.

During the inspecting step, described above, fluctuation occurs in positions of the patterns obtained from the inspection result due to thermal drift caused by long-time irradiation of inspecting light, fluctuation of air flow inside the inspection apparatus, measurement error of a length-measuring system due to various heat sources in the inspection system, and the like. In this embodiment, therefore, the positions of the patterns on the position error correcting unit 10 together with the positions of the patterns of the mask 101 are measured and the positions of the patterns on the position error correcting unit 10 is compared with the above true values at the inspecting step. Since differences between the true values and the measured values are positional fluctuations occurring at the inspecting step, it possible to obtain correct positions of respective patterns by correcting the pattern positions of the mask 101 using such values of positional fluctuation (hereinafter referred to as fluctuation values).

Fluctuation values of the pattern positions occurring in the inspection process can be obtained in the following manner.

A pattern provided in the position error correcting unit 10 is virtually divided by the same stripes as the stripes used for dividing an inspection region on the mask 101, namely, nine stripes from the first stripe 20a to the ninth stripe 20i. By performing such division, the images of the divided pattern of the position error correcting unit 10 can also be inputted into the photodiode array continuously with inputting the images on the inspection region into the photodiode array.

That is, as described above, respective images on the first stripe 20a, the second stripe 20b, the third stripe 20c etc, which divide the inspection region of the mask 101 are acquired according to movements of the stage 102. Here, not only the inspection region of the mask 101, but also the pattern region of the position error correcting unit 10 is included in a movement range of the stage 102 in the X direction. However, a region required until the stage 102 reaches uniform movement, namely, an acceleration region of the stage 102 is not included in the movement range defined here.

By adopting such a configuration as described above, the respective images of the first stripe 20a, the second stripe 20b, the third stripe 20c, etc, in the position error correcting unit 10 are also acquired during a series of movements of the stage 102. That is, the images of the inspection region of the mask 101 and the images of the patterns in the position error correcting unit 10 can be acquired efficiently.

From the images of the patterns of the position error correcting unit 10 acquired according to the above method, position coordinates of the respective patterns are obtained. Fluctuation values of the position coordinates of the patterns occurring in the inspection process are obtained by obtaining differences between the position coordinates obtained and the true values of the position coordinates obtained in advance.

For example, it is assumed that a plurality of cross-shaped patterns is provided in the position error correcting unit 10. Regarding one of the cross-shaped patterns, a true value of position coordinates thereof is obtained. Similarly, true values of the position coordinates of the other cross-shaped patterns are also obtained. An average value (an average value of the true values) of the position coordinates of the cross-shaped patterns contained in a predetermined region is obtained. Here, the predetermined region can be set to, for example, a region having a size of 2 mm×2 mm. Incidentally, one stripe is composed of a collection of a predetermined number of such predetermined regions.

Next, inspection of the mask 101 is performed. At this time, the inspection region on the mask 101 is virtually divided toward the Y direction by nine stripes from the first stripe 20a to the ninth stripe 20i. Similarly, the pattern on the position error correcting unit 10 is also virtually divided by the same stripes, that is, by the stripes from the first stripe 20a to the ninth stripe 20i. Regarding both the inspection region on the mask 101 and the position error correcting unit 10, the stage 102 is moved such that all the stripes are continuously scanned.

For example, in FIG. 1, arrows show directions in which images are acquired. Starting from the first stripe 20a in the position error correcting unit 10, the first stripe 20a on the mask 101 is scanned by moving the stage 102 in the −X direction. Thereby, an image of the first stripe 20a on the mask 101 is acquired following an image of the first stripe 20a of the position error correcting unit 10. Next, an image of the second stripe 20b on the mask 101 is acquired by moving the stage 102 in the X direction after having moved the stage in the −Y direction in a stepping fashion. Subsequently, an image of the second stripe 20b of the position error correcting unit 10 is acquired. Thereafter, the respective images of the third stripes 20c, the fourth stripes 20d, through to the ninth stripes 20i regarding both the position error correcting unit 10 and the mask 101 are acquired according to the directions indicated by the arrows.

The position coordinates of the respective cross-shaped patterns provided on the position error correcting unit 10 are obtained based upon the optical images of the position error correcting unit 10 acquired during the above step. The average value (the average value of actually-measured values) of the position coordinates of the cross-shaped patterns contained in the same predetermined region as that when true values have been obtained is then calculated.

In the inspection process, errors occur in measurement positions of patterns due to thermal drift or fluctuation of air flow within the inspection system caused by long-time irradiation of an inspection light, measurement errors of a position measuring system caused by various heat sources in the inspection system, or the like. That is, the position coordinates of the patterns in the position error correcting unit 10 do not coincide with true values of the position coordinates obtained in advance. Therefore, a fluctuation value of the position coordinates of the pattern occurring in the inspection process can be known by calculating a difference between the <average value of true values> and the <average value of actually-measured values> obtained above.

Incidentally, instead of adopting the difference between the average values as the fluctuation value, differences between the true values and the actually-measured values of the respective patterns can be adopted as the fluctuation values. However, when the position deviation amounts are corrected based upon the fluctuation values of the respective patterns, a data amount to be processed becomes vast. On the other hand, it is thought that a difference in fluctuation value between adjacent patterns is minute at the inspection time. As described above, therefore, regarding the patterns included in the predetermined region, it is preferred that respective average values of the true values and the actually-measured values in the predetermined region are obtained and a differences between the average value of the true values and the average value of the actually-measured values is adopted as the fluctuation values.

A phenomenon whereby the position coordinates of the patterns fluctuate is caused by the fact that the inspection time becomes too long. Therefore, the fluctuation value is not constant, and it becomes larger according to the increase of time elapsing from the start of the inspection. That is, on the mask 101, the fluctuation values of the position coordinates of the respective patterns become larger in the order of the first stripe 20a, the second stripe 20b, etc, through to the ninth stripe 20i. Similarly, the fluctuation values of the position coordinates of the patterns in the position error correcting unit 10 also become larger in the order of the first stripe 20a, the second stripe 20b, etc, through to the ninth stripe 20i. Further, even if patterns are included in the same stripe, as compared with the fluctuation value of the coordinate position of a pattern first inspected, the fluctuation value of the coordinate position of a pattern inspected thereafter becomes larger. Therefore, linear interpolation is performed using the fluctuation values of the position coordinates obtained from differences between the <average value of true values> and the <average value of actually-measured values> in the position error correcting unit 10. Thereby, the fluctuation values of the position coordinates of the patterns on the mask 101 can be obtained. The position deviation amounts of the patterns can be reduced by correcting the actually-measured values using the fluctuation values thus obtained.

Incidentally, it goes without saying that obtaining the fluctuation values of the position coordinates of the patterns on the mask 101 is not limited to the above-described linear interpolation. For example, interpolation using a high-order function such as B-spline curve may be adopted.

Further, for example, regarding a predetermined means region in the position error correcting unit 10, an average value of the fluctuation values of the position coordinates obtained from the differences between the <average value of true values> and the <average value of actually-measured value> is obtained. For example, regarding a region defined by a range of the X coordinate from 0 to 2 and a range of the Y coordinate from 0 to 2, an average value of the fluctuation values of the position coordinates obtained from the above differences is obtained. Using the average value, all actually-measured values contained in a range of the Y coordinate from 0 to 2 in the inspection region on the mask 101 can be corrected.

Incidentally, even when the position error correcting unit 10 is arranged in a different position, as shown in FIG. 1, the fluctuation values of the position coordinates of the patterns can be obtained. For example, the position error correcting unit 10 can be provided on the side opposed to the mask 101 position shown in FIG. 1.

In this embodiment, however, as shown in FIG. 1, it is preferred that the position error correcting unit 10 is disposed such that an arrangement direction of the stripes is perpendicular to the moving direction (X direction) of the stage, but it is not preferred that the arrangement direction of the stripes is perpendicular to the Y direction. That is, it is improper to arrange the position error correcting unit 10 in a direction obtained by rotating the arrangement shown in FIG. 1 by 90°. This is for the following reason.

If the arrangement shown in FIG. 1 is adopted, as described above, both images on the position error correcting unit 10 and the mask 101 can be acquired according to a series of movements of the stage 102 for scanning the first stripes 20a to the ninth stripes 20i. However, when the position error correcting unit 10 is arranged in a direction obtained by rotating the position error correcting unit 10 from the arrangement shown in FIG. 1 by 90°, the fluctuation values of the position coordinates of the patterns can be obtained, but the patterns on the position error correcting unit 10 cannot be divided using the same stripes as those of the mask 101, so that the above-described both the images cannot be acquired according to the series of movements of the stage 102.

For example, after the first stripe on the position error correcting unit 10 has been scanned, it is necessary to scan the first stripe on the mask 101 after the stage 102 is moved in the X direction and in the Y direction. Further, it is necessary to change the scanning direction for the mask 101 in this case from the scanning direction for the position error correcting unit 10. After scanning of the first stripe on the mask 101 has been completed, the second stripe is scanned after returning to the position error correcting unit 10 again. Even at this time, in addition to the stage 102 moving in the X direction and in the Y direction, the scanning direction for the position error correcting unit 10 must be changed from the scanning direction for the mask 101. Regarding scans subsequent thereto, it is necessary to change the position and the moving direction of the stage 102 between the case of scanning the mask 101 and the case of scanning the position error correcting unit 10.

When the arrangement of the position error correcting unit 10 is such that the arrangement direction of the stripes thereof is perpendicular to the Y direction to acquire both the images on the position error correcting unit 10 and the mask 101 in this manner, movements of the stage 102 become complicated. This results in a prolonging of the inspection time. Therefore, it is preferred that the position error correcting unit 10 is arranged such that the arrangement direction of the stripes thereof is perpendicular to the moving direction (X direction) of the stage.

Next, an inspection system according to the present embodiment will be described in detail.

Figure 2:
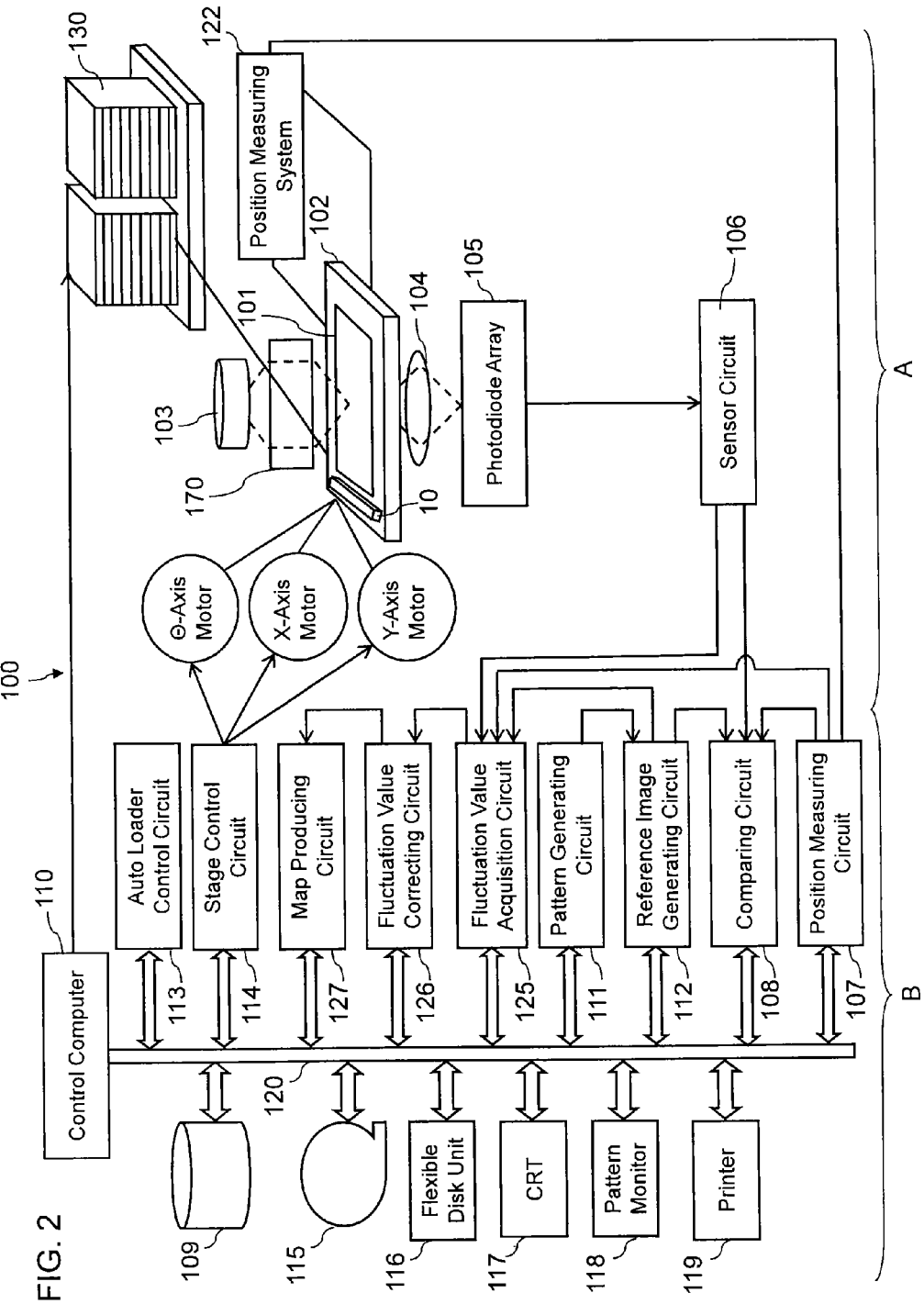
FIG. 2 is a diagram showing the configuration of an inspection system according to embodiment 1.

FIG. 2 is a diagram showing the configuration of an inspection system according to the present embodiment. As shown in FIG. 2, the inspection system 100 includes an optical image acquiring unit A and a control unit B.

The optical image acquiring unit A includes a light source 103, a stage 102 movable in the horizontal X and Y directions and rotatable in a horizontal plane (or in a θ direction), an illumination optical unit 170 serving as a transmission illumination system, an enlarging optical unit 104, a photodiode array 105, a sensor circuit 106, a fluctuation value acquiring circuit 125, a position measuring system 122, and an auto loader 130. The mask 101 is automatically loaded onto the stage 102 from the auto loader 130 driven by the auto loader control circuit 113, and, upon completion of its inspection, the mask 101 is automatically retrieved from the stage 102.

In the control unit B, a control computer 110 which controls the entire inspection system 100 is connected through a bus 120 (serving as a data transmission path) to a position measuring circuit 107, a comparing circuit 108, a reference image generating circuit 112, a pattern generating circuit 111, the fluctuation value acquiring circuit 125, a fluctuation value correcting circuit 126, a map generating circuit 127 an auto loader control unit 113, a stage control circuit 114, a magnetic disk unit 109 serving as a storage unit, a magnetic tape unit 115, a flexible disk unit 116, a CRT 117, a pattern monitor 118, and a printer 119.

The comparing circuit 108 corresponds to a comparing unit according to the present invention. The fluctuation value acquiring circuit 125 corresponds to a fluctuation value acquiring unit according to the present invention. The fluctuation value correcting circuit 126 corresponds to a fluctuation value correcting unit according to the present invention. The map generating circuit 127 corresponds to a map producing unit according to the present invention.

X-, Y-, and θ-axis motors controlled by the stage control circuit 114 drive the stage 102. These motors may be, for e.g., step motors.

The position of the stage 102 is measured by the position measuring system 122, and the measurement data is sent to the position measuring circuit 107. An optical image 204 output from the sensor circuit 106 is sent to the comparing circuit 108, together with data indicative of the position of the mask 101 on the stage 102, the data is data output from the position measuring circuit 107.

Design pattern data which is used as reference data in die-to-database inspection is stored in the magnetic disk unit 109. This data is read out and sent to the pattern generating circuit 111, when necessary, in the course of the inspection process. The pattern generating circuit 111 converts the design pattern data into image data (or bit pattern data). This image data is then sent to the reference image generating circuit 112 for the generating of reference data. The reference data generated from the design pattern data is sent to the comparing circuit 108.

It should be noted that the inspection system of the present embodiment may include, in addition to the components shown in FIG. 2 described above, other known components used in the process of inspecting masks, for example, the inspection system may include a review device described later.

Figure 3:
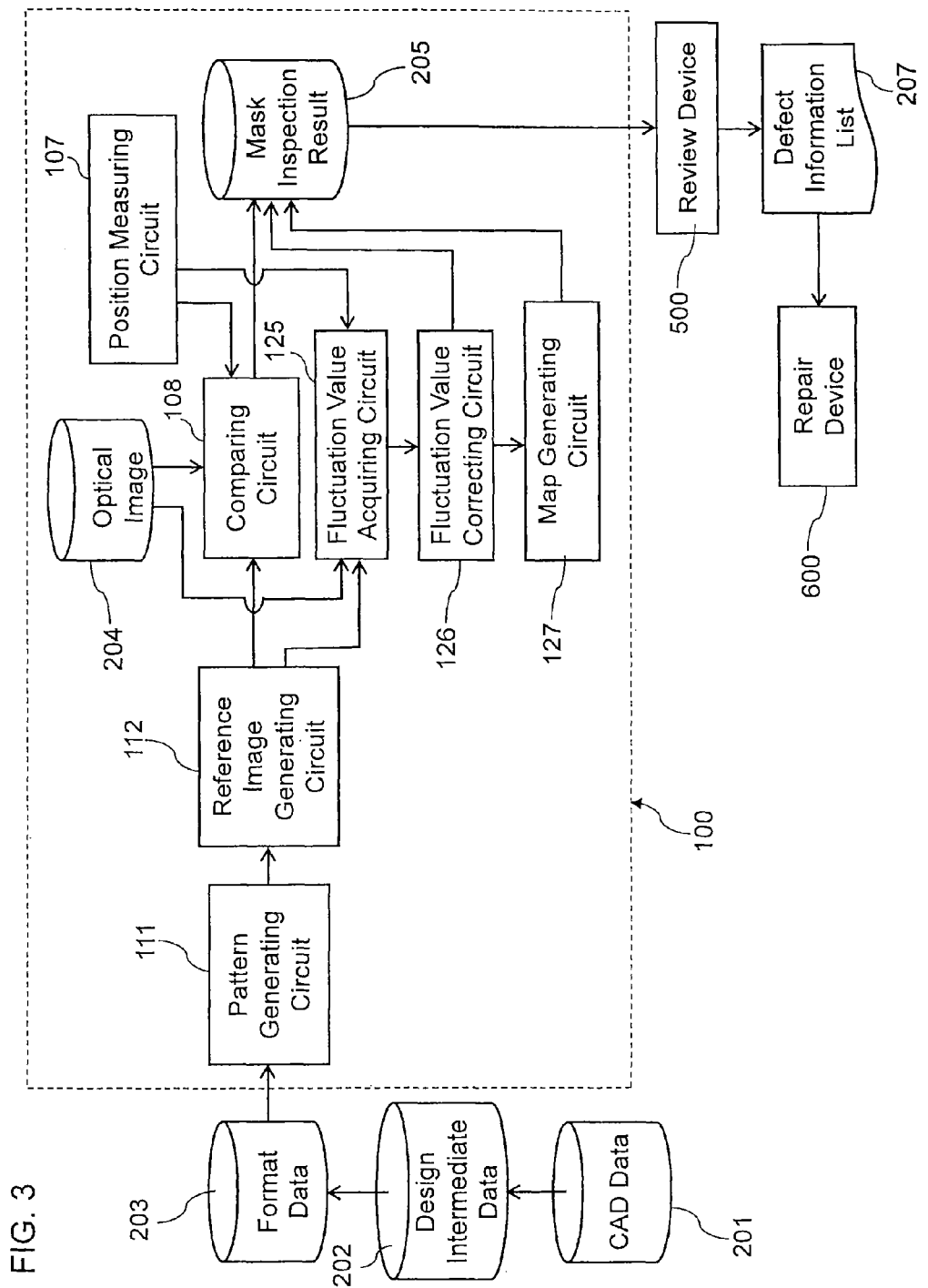
FIG. 3 is a schematic diagram showing a flow of data according to embodiment 1.

FIG. 3 is a schematic diagram showing a flow of data according to the present embodiment.

As shown in FIG. 3, CAD data 201 prepared by the designer (or user) is converted to design intermediate data 202 in a hierarchical format such as OASIS. The design intermediate data 202 includes data of the pattern formed on the mask generated for each layer. It should be noted that, generally, inspection systems are not adapted to be able to directly read the design intermediate data 202. That is, each manufacturer of inspection systems uses different format data. Therefore, the design intermediate data 202 is converted, for each layer, to format data 203 in a format specific to the inspection system 100 used, and this format data 203 is input to the inspection system 100. Although the format data 203 may be data specific to the inspection system 100, the format data 203 may also be data compatible with a writing apparatus.

Figure 4:
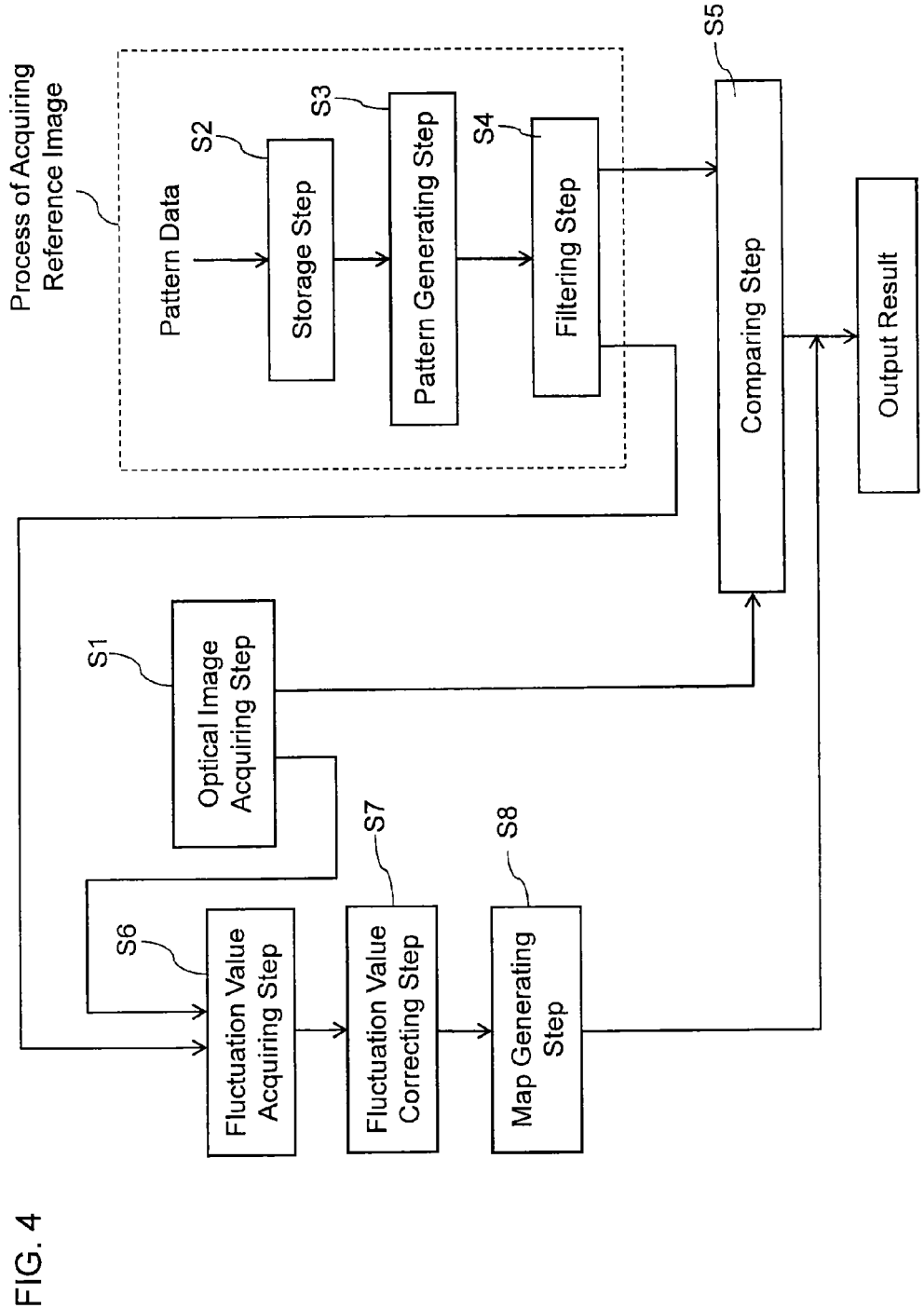
FIG. 4 is a flowchart of an inspection process according to embodiment 1.

FIG. 4 is a flowchart of an inspection process according to the present embodiment. The inspection method adopting the die-to-database method will now be described. A reference image to be compared with an optical image of a sample to be inspected is a reference image generated based upon the write data (design pattern data). Incidentally, the inspection system of the present invention can be also applied to the inspection method using the die-to-die method, where the reference image is an optical image different from the sample to be inspected.

As shown in FIG. 4, the inspection process includes an optical image acquiring step (S1), a storage step (S2) for design pattern data constituting reference image acquiring step, a pattern generating step (S3), a filtering step (S4), a comparison step (S5) between an optical image and a reference image, a fluctuation value acquiring step (S6) of acquiring position coordinates on a position coordinate correcting unit, a fluctuation value correcting step (S7) for correcting the position coordinates of mask patterns, and a map producing step (S8) of producing a map of position coordinate fluctuation values on an entire mask pattern.

<Optical Image Acquiring Step>

In the optical image acquiring step (S1) as shown in FIG. 4, an optical image acquiring unit A (shown in FIG. 2) acquires an optical image (hereinafter referred to as measurement data) of the mask 101 and an optical image of the position error correcting unit 10. The optical image of the mask 101, is an image of a mask on which figures are written based on figure data included in the design pattern. The optical image on the position error correcting unit 10 is an image of a figure for forming a pattern serving as a reference for correcting a position error.

The following is one example of the way in which an optical image is acquired.

The sample, in this instance a mask 101 is mounted on the stage 102, the stage is movable in two horizontal directions using X- and Y-axis motors and rotatable in a horizontal plane using a Ο-axis motor. The position error correcting unit 10 is provided on the stage 102. The inspection region of the mask 101 is virtually divided into a plurality of stripes, and the pattern of the position error correcting unit 10 is also virtually divided by these stripes.

Each pattern formed on the mask 101 and the position error correcting unit 10 is then irradiated with light emitted from the light source 103 disposed above the stage 102. More specifically, the beam of light emitted from the light source 103 passes through the illumination optical unit 170 and shines on the mask 101 and the position error correcting unit 10. The enlarging optical unit 104, the photodiode array 105, and the sensor circuit 106 are disposed below the stage 102. The light transmitted through the mask 101 and the position error correcting unit 10 passes through the enlarging optical unit 104 and reaches the photodiode array 105, thereby forming an optical image thereon.

It should be noted that the enlarging optical unit 104 may have its focus automatically adjusted by an autofocus mechanism (not shown). Further, the position error correcting unit 10 may be structured so as to be capable of being moved up and down by a spring mechanism or the like. According to this structure, when a mask 101 of different thickness is a sample to be inspected, the height of the mask 101 and the height of the position error correcting unit 10 can coincide with each other by adjusting the position of the position error correcting unit 10.

The position error correcting unit 10 is arranged so that the arrangement direct ion of the stripes thereof is perpendicular to the moving direction (X direction) of the stage. When the stage 102 moves in the −X direction, images in the first stripes 20a of the mask 101 and the position error correcting unit 10 are inputted into the photodiode array. Next, when the stage 102 is moved in the X direction, after moving in the −Y direction in a step fashion, images in the second stripes 20b of the mask 101 and the position error correcting unit 10 are inputted into the photodiode array. Further, when the stage 102 is moved in the −X direction after moving in the −Y direction, images in the third stripes 20c of the mask 101 and the position error correcting unit 10 are inputted into the photodiode array. In the subsequent steps, images in all the stripes are similarly inputted into the photodiode array.

The pattern image formed on the photodiode array 105 is photoelectrically converted by the photodiode array 105 and A/D (analog to digital) converted by the sensor circuit 106 into an optical image. An image sensor is arranged in the photodiode array 105. As for the image sensor according to the present invention, a line sensor composed of CCD (charge coupled devices) cameras lined up serving as an imaging device is used. The line sensor may be, for e.g., TDI (Time Delay Integration) sensors. Thus, the pattern on the mask 101 is imaged by these TDI sensors while the stage 102 is continuously moved in the positive or negative X direction. The light source 103, the enlarging optical unit 104, the photodiode array 105, and the sensor circuit 106 together form a high power optical unit inspection.

The stage 102 can be moved in the X and Y directions and rotated in a θ direction (or in an XY plane) by a drive system such as a 3-axis (X-Y-θ) motor driven by the stage control circuit 114 under the control of the control computer 110. These X-, Y-, and θ-axis motors may be, for e.g., step motors. The position of the stage 102 is measured by the position measuring system 122, and the measurement data is sent to the position measuring circuit 107. The mask 101 is automatically loaded onto the stage 102 from the auto loader 130 driven by the auto loader control circuit 113, and upon completion of the inspection, the mask 101 is automatically retrieved from the stage 102.

The optical image 204, which was acquired in the optical image acquiring step (S1), is sent to the comparing circuit 108 and the fluctuation value acquiring circuit 125 in FIG. 2.

<Storage Step>

At the storage step (S2), as seen in FIG. 4, the design pattern data that was used to form the pattern on the mask 101, and the pattern data of the position error correcting unit 10 are stored in the magnetic disk unit 109 serving as a storage unit (as shown in FIG. 2).

The designed pattern includes pattern figures each consisting of basic figures such as rectangles and triangles. The magnetic disk unit 109 stores feature data indicating the shape, size, and position of each pattern feature, specifically, information such as the coordinates (x, y) of the reference position of each feature, the length of its sides, and a shape code (or identifier) identifying the type of shape, such as a rectangle or triangle. Further, a figure constituting patterns of the position error correcting unit 10 may have, for example, a cross shape, a line shape or the like.

A group of pattern figures, defined in an area of approximately a few tens of micrometers square is generally referred to as a "cluster" or "cell". In the storage step, it is common practice that the design pattern data is defined in a hierarchical structure using clusters or cells. A cluster (or cell), which contains a pattern feature or figures, may be used alone or repeated at certain intervals. In the former case the coordinate positions of the cluster (or cell) on the mask are specified, whereas in the latter case the coordinate positions of each copy of the cluster (or cell) are indicated together with a repetition instruction. Each cluster (or cell) is disposed in a strip-shaped region, referred to as a "frame" or "stripe", having a width of a few hundreds of micrometers and a length of approximately 100 mm which corresponds to the length of the mask in the X or Y direction.

<Pattern Generating Step>

At the pattern generating step (S3) in FIG. 4, the pattern generating circuit 111 (shown in FIG. 2) reads design pattern data of the mask 101 from the magnetic disk unit 109 through the control computer 110 and converts it into 2-bit or other multiple-bit image data (bit pattern data). This image data is sent to the reference image generating circuit 112.

Specifically, upon reading the design pattern data, the pattern generating circuit 111 generates data of each pattern feature, and interprets the shape code in the data indicative of the shape of the pattern feature and obtains its dimensions. The pattern generating circuit 111 then divides the pattern into an imaginary grid of squares (or grid elements) having predetermined quantization dimensions, and generates 2-bit or other multiple-bit design image data of the design pattern segment in each grid element. By using the generated design image data, the pattern generating circuit 111 calculates the design pattern occupancy in each grid element (corresponding to a sensor pixel). This pattern occupancy in each pixel represents the pixel value.

<Filtering Step>

At the filtering step (S4) in FIG. 4, after receiving the design image data the reference image generating circuit 112 performs appropriate filtering on the data.

Figure 5:
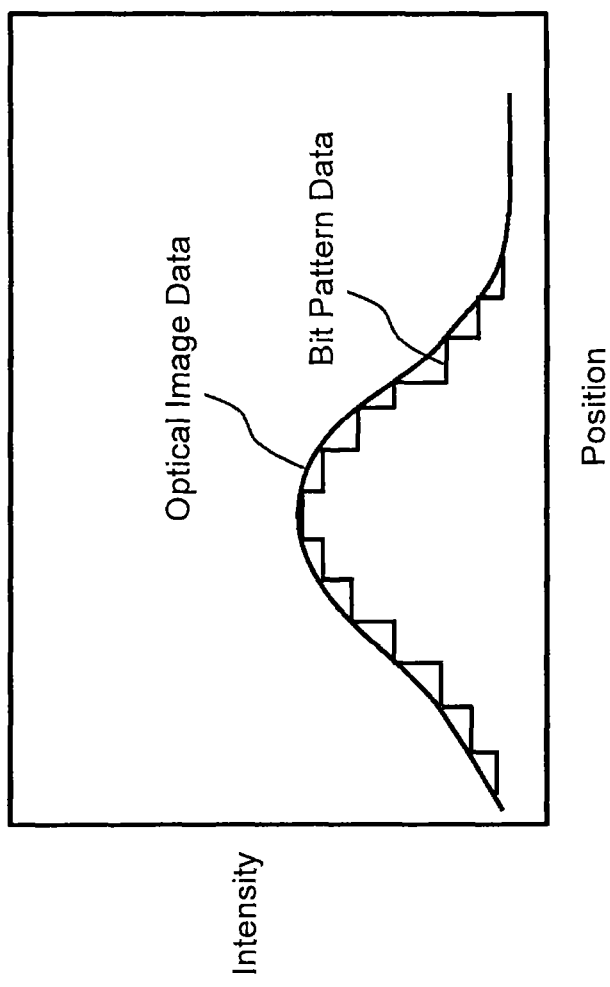
FIG. 5 is a diagram illustrating the filtering according to embodiment 1.

FIG. 5 is a diagram illustrating the filtering.

The optical image (or the measurement data representing it) output from the sensor circuit 106 is somewhat blurred due to the resolution characteristics of the enlarging optical unit 104 and due to the aperture effect in the photodiode array 105, this optical image is a spatially low-pass filtered image. Therefore, since the design image data corresponding to the optical image is digital data consisting of digital values representing the intensity (or gray scale) of each point of the image, this design image data may be filtered to match the blurred optical image, or measurement data. In this way, a reference image to be compared with the optical image 204 is generated.

<Comparison Step>

As described above, data of the optical image 204 of the mask 101 acquired in step (S1), as shown in FIG. 4, and outputted from the sensor circuit 106 is sent to the comparing circuit 108. After conversion into reference image data by the pattern generating circuit 111 and the reference image generating circuit 112, the pattern data of the mask 101 is also sent to the comparing circuit 108. Further, data indicating the position of the mask 101 on the stage 102, which has been measured by the position measuring system 122 to be sent to the position measuring circuit 107, is also sent to the comparing circuit 108.

The comparing circuit 108 compares each portion of the optical image 204 of the mask 101 received from the sensor circuit 106 with the corresponding portion of the reference image generated by the reference image generating circuit 112 in accordance with a suitable comparison determination algorithm, and if the difference, for example, in dimension, between these portions exceeds a predetermined value, the comparing circuit 108 determines that the portion of the optical image is defective. If it is determined from the comparison that a portion of the optical image is defective, then the coordinates of that portion, the optical image 204, and the reference image, on which the detection of the defect is based, are stored as a mask inspection result 205 in the magnetic disk unit 109.

Identification of defects can be performed according to the following two types of methods. One method is directed to identifying defects when there is a difference exceeding a predetermined threshold dimension between a position of the outline of the reference image and a position of the outline of the optical image. The other one is directed to identifying defects when the ratio of the line width of the pattern in the reference image and the line width of the pattern in the optical image exceeds a predetermined threshold. With the latter method, the ratio of the distance between patterns in the reference image and the distance between patterns in the optical image may be used for identification of defects.

<Fluctuation Value Acquiring Step>

The optical image 204 obtained at the optical image acquiring step (S1) is sent from the sensor circuit 106 to the fluctuation value acquiring circuit 125. Further, the reference image obtained at the reference image acquiring step is also sent from the reference image generating circuit 112 to the fluctuation value acquiring circuit 125. Further, the data indicating the movement position of the stage 102, which has been measured by the position measuring system 122, is sent from the position measuring circuit 107 to the fluctuation value acquiring circuit 125. The average value of true values of the pattern position coordinates in the position error correcting unit 10 is stored in the fluctuation value acquiring circuit 125. The average value of the true values can be obtained by obtaining true values of the position coordinates of the respective patterns and next obtaining an average value of the true values for each predetermined region.

In the fluctuation value acquiring circuit 125, the position coordinates of the respective patterns provided in the position error correcting unit 10 are obtained based upon the respective data sent, and an average value (an average value of actually-measured values) of the position coordinates of the pattern included in the same predetermined region as that when the average value of true values has been obtained is next obtained using the values of the position coordinates obtained. A difference between the <average value of true values> and the <average value of actually-measured values> is calculated. Thereby, regarding the patterns of the position error correcting unit 10, fluctuation values of the position coordinates occurring in the inspection process are acquired. Incidentally, acquiring of the fluctuation values is performed for each stripe, and when the fluctuation values of the position coordinates of all the stripes have been acquired, the step (S6) is terminated.

<Fluctuation Value Correcting Step>

The fluctuation values of the position coordinates are sent from the fluctuation value acquiring circuit 125 to the fluctuation value correcting circuit 126. Further, the data indicating the movement positions of the stage 102 measured by the position measuring system 122 is also sent from the fluctuation value acquiring circuit 125 to the fluctuation value correcting circuit 126.

In the fluctuation value correcting circuit 126, for example, fluctuation values of the position coordinates of the patterns on the mask 101 are obtained by linear interpolation using the fluctuation values sent. Actually-measured values of the position coordinates of the patterns are corrected using the fluctuation values.

<Map Producing Step>

The fluctuation values of the position coordinates of the patterns on the mask 101, which have been obtained in the fluctuation value correcting circuit 126, are sent to the map generating circuit 127. In the map generating circuit 127, a map of the position coordinate fluctuation values on the entire mask pattern is generated based upon these fluctuation values. The map generated is stored in the magnetic disk unit 109 as a mask inspection result 205.

As a result of the three steps described above, that is, the fluctuation value acquiring step (S6), the fluctuation value correcting step (S7), and the map producing step (S8), the position errors of the patterns occurring in the inspection process can be grasped and reduced. These steps will be further described in detail with reference to FIG. 6.

Figure 6:
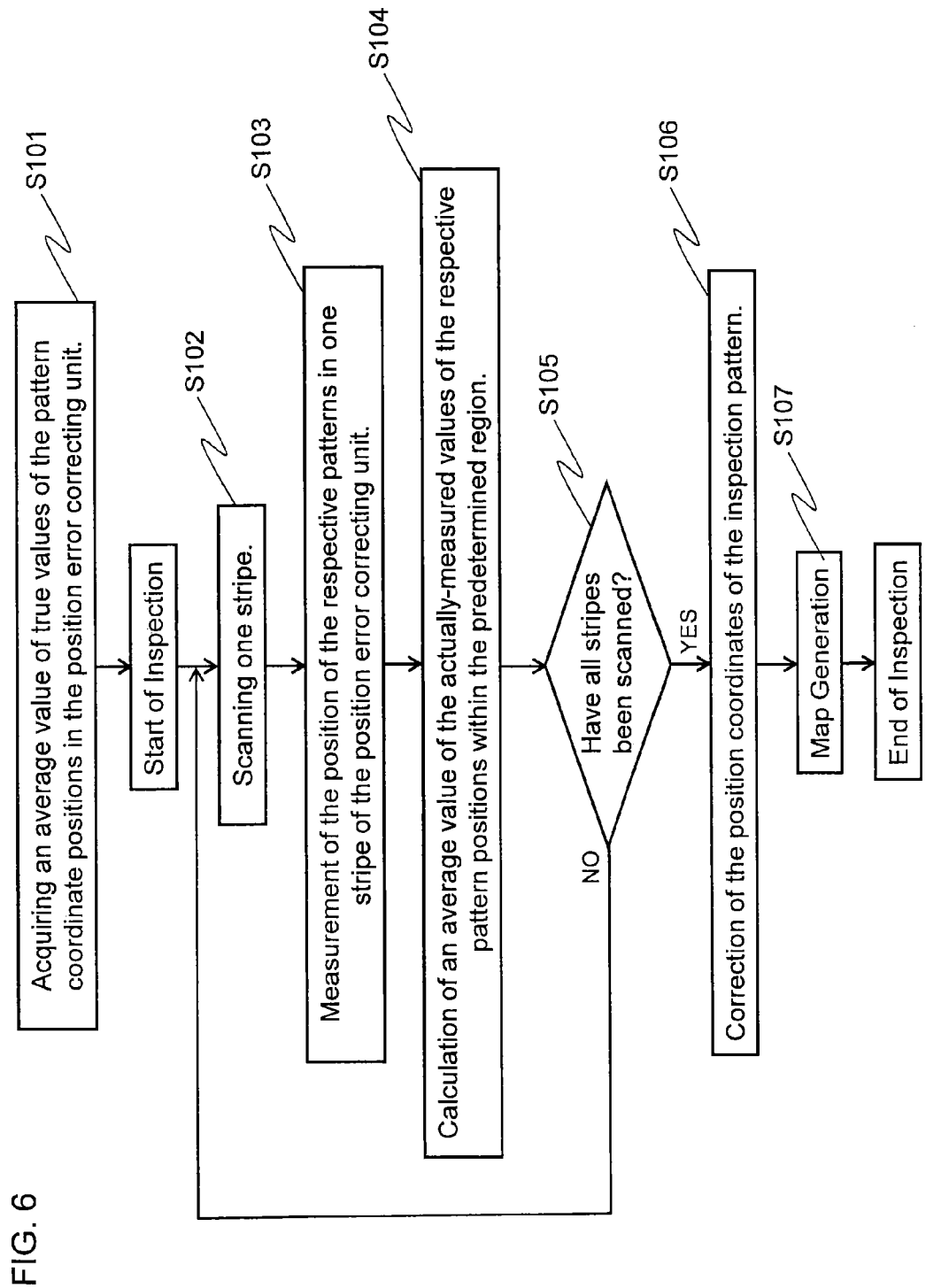
FIG. 6 is a flowchart of a fluctuation value acquiring process, a fluctuation value correcting process, and a map producing process according to embodiment 1.

In FIG. 6, at the step S101, an average value of true values of the pattern coordinate positions in the position error correcting unit 10 is acquired. The step S101 is performed under conditions different from conditions at the step S102 and the steps subsequent thereto in the inspection process. That is, the step S101 is not affected by heat and fluctuation of airflow such as that occurring in the inspection process. The true values are measured by a coordinate measuring apparatus such as Model LMS-IPRO manufactured by Leica, or the like.

After the position coordinates of the true values have been acquired at the step S101, the inspection process (the steps S102 to S107) is started. Incidentally, though omitted in FIG. 6, it goes without saying that the optical image acquiring step (S1), the design pattern data storage step (S2), the pattern generating step (S3), the filtering step (S4), and the comparing step (S5) which are shown in FIG. 4 are also included in the inspection process.

First of all, one stripe of both the position error correcting unit 10 and the mask 101 are scanned and image data thereof are acquired (S102). Next, actually-measured values of the position coordinates of the respective patterns of the position error correcting unit in the acquired one stripe are obtained (S103). Then, an average value of the actually-measured values of the respective pattern positions within the predetermined region is calculated based upon the values obtained at the step S103 and a difference between the average value of the actually-measured values and the average value of true values obtained at the step S101 is calculated (S104). Thereby, the fluctuation values of the pattern coordinate positions on the position error correcting unit 10 are obtained. Incidentally, the steps S103 and S104 are performed in the fluctuation value acquiring circuit 125.

Next, at step S105, it is determined whether or not all the stripes have been scanned. The determination can be performed in the control computer 110. If there is a stripe which has not been scanned yet, the control returns to the step S102 and the above steps are repeated. On the other hand, when all the stripes have been scanned, the control proceeds to step S106, where the fluctuation values of the position coordinates of the inspection patterns provided on the mask 101 are obtained. Next, the actually-measured values of the coordinate positions of the patterns are corrected using the fluctuation values. Incidentally, the step S106 is performed in the fluctuation value correcting circuit 126.

Next, at step S107, a map of the position coordinate fluctuation values on the entire mask pattern is generated from the fluctuation values of the position coordinates of the patterns on the mask 101. Step S107 is performed in the map generating circuit 127. The inspection process is terminated after step S107 has been performed.

The determination results at the comparing circuit 108, that is, coordinates of defects, the optical image underlying the defect judgment, and the reference image are stored as mask inspection results 205 in the magnetic disk unit 109. Further, the map generated in the map generating circuit 127 is stored as mask inspection results 205 in the magnetic disk unit 109. The mask inspection results 205 are then sent to the review device 500.

The term "review" as used herein refers to an operation performed by the operator to determine whether a detected defect can be tolerated. Specifically, the mask inspection results 205 are sent to the review device 500 for review, the review is performed by the operator and the operator determines whether a pattern defect found in the inspection can be tolerated. The operator can compare the reference image as a basis for the defect judgment with the optical image, which includes the defect for review.

To observe defect coordinates of defects one by one, the review device 500 displays images of defect portions on a mask while moving the stage on which the mask is set. The review device 500 aligns and displays optical images and reference images simultaneously which serve to display defects visually, and to further display data on the information of the defect portion, on the screen to check. For this screen, the screen of a calculator of the review device 500 is utilized.

When the inspection system 100 includes the review device 500, the review device 500 displays images of defect portions on the mask using the observing optical unit of the inspection system 100. The review device 500 aligns and displays optical images and reference images simultaneously which serve to display defects visually, and to further display data on the information of the defect portion, on the screen to check. For this screen, the screen of the control computer 110 is utilized.

The information of a defect determined through the review process is stored in the magnetic disk unit 109 as shown in FIG. 2. When even one defect to be repaired is confirmed in the review device 500, the mask is sent, with a defect information list 207, to a repair device 600, which is an external device of the inspection system 100. Since the repair method is different according to the type of defect, that is, between the extrusion and intrusion defects, the type of the defect, including determination between the extrusion and intrusion defects and the coordinates of the defect are added to the defect information list 207.

As described above, in this embodiment, the position error correcting unit is provided on the stage. Then, an inspection region of a sample to be inspected is virtually divided by a plurality of stripes, and a region on the position error correcting unit is also virtually divided by these stripes. When inspection is performed, the stage is moved so that all the stripes of both the inspection region of the sample to be inspected and the position error correcting unit are continuously scanned. Actually-measured values of the position coordinates of the respective patterns provided on the position error correcting unit are obtained based upon the optical image thus obtained. Then, the position errors of the patterns occurring in the inspection process can be reduced by acquiring fluctuation values of the position coordinates occurring in the inspection process from differences between the average values of the true values of the position coordinates obtained in advance and the average values of the actually-measured values and correcting the position coordinates of the patterns of the sample to be inspected using the fluctuation values. Further, a distribution of the position errors of the patterns on the sample to be inspected occurring in the inspection process can be grasped by producing a map of the position coordinate fluctuation values on the entire sample to be inspected from the fluctuation values of the position coordinates of the patterns on the sample to be inspected.

Embodiment 2

In the second embodiment, a light amount calibration unit including a white pattern on a surface thereof is provided on the stage. The inspection region of a sample to be inspected is virtually divided by a plurality of stripes, and the pattern on the light amount calibration unit is also virtually divided by these stripes. By providing such a light amount calibration unit, a range of a light amount serving as a base for determination as to whether or not the inspection result will be correct, is calibrated, so that inspection will always be performed correctly. Therefore, it becomes possible to reduce a position error due to improper inspection. An inspection system and an inspection method according to this embodiment will be described in detail below. In this embodiment, however, though a mask used in photolithography is used as the sample to be inspected, the sample to be inspected is not limited to a mask.

The inspection system according to this embodiment is similar to the inspection system according to the first embodiment except that the light amount calibration unit is provided instead of the position error correcting unit of the first embodiment, and the fluctuation value acquiring circuit 125, the fluctuation value correcting circuit 126, and the map generating circuit 127 are not provided.

The sample, in this case a mask, is mounted on the stage of the inspection system. In an inspection process, each pattern formed on the mask is then irradiated with light emitted from the light source disposed above the stage. The light transmitted through the mask reaches the photodiode array, thereby forming an optical image thereon. The pattern image formed on the photodiode array 105 is photoelectrically converted by the photodiode array and A/D (analog to digital) converted by the sensor circuit into an optical image. The optical image is then sent to the comparing circuit.

An image sensor is arranged in the photodiode array 105. As for the image sensor according to the present invention, a line sensor composed of CCD (charge coupled devices) cameras lined up serving as an imaging device is used. The line sensor may be, for e.g., TDI (Time Delay Integration) sensors.

To generate an optical image, the amount of light focusing on a photodiode array must be at the correct level in order to perform inspection properly. For example, when the light amount of the optical image is excessively low, blurring of a contour line or the like occurs, which results in difficulty in accurate reading of a line width, a distance between lines which is required for defect judgment. Therefore, inspection accuracy is lowered such that a matter which would not originally be determined as a defect is actually determined as a defect, while a matter which should be determined as a defect is actually determined as a non-defect. Similarly, when the light amount is excessively high, it becomes difficult to read a line width or a distance between lines accurately, which results in the lowering of inspection accuracy.

In view of this, before inspection the photodiode array is calibrated using white portions and black portions of the mask. In this case, undershooting and overshooting of the light amount are also taken into consideration.

However, even if the calibration is performed before inspection, there is a possibility that the amount of light will fluctuate during inspection. As to the causes of this fluctuation, there can be, as one example, fluctuation of the light source; furthermore, a white spot occurring due to a cosmic ray may be one of the causes. Since the photodiode array has sensitivity to the cosmic ray, a dot-like pseudo image (white spot) occurs on an image at a position through which the cosmic ray has passed. Since the white spot is brighter than the surrounding region thereof, occurrence of the white spot results in an increase in the amount of light on the optical image, in this situation it is difficult to determine if the white spot is an actual defect.

Further, there is a case wherein the light, which has passed through the mask, is refracted and enters a sensor different from a sensor, which the light should have entered originally, which results in a change of the amount of light in the optical image. In this case, since the refracted light, in addition to the original incident light, is incident on a sensor on which the refracted light has been incident, the amount of light incident on the sensor exceeds a range of light amount, and as a result the inspection result will not be a true indication. On the other hand, since light is not sufficiently incident on a sensor on which the refracted light should be originally incident, the amount of light incident on the sensor results in a range less than the above range.

In this embodiment, measurement of the light amount is performed in parallel with the inspecting step. When the amount of light measured exceeds the range of light amount, which allows proper inspection, calibration of the light amount is performed during or after the inspection. Specifically, a light amount calibration unit is provided on the stage. A white pattern is formed on a surface of the light amount calibration unit. By using the white pattern, the light amount (output of white level) of the photodiode array is checked. Incidentally, the shape of the white pattern is not particularly limited, and it may be any one of a circular shape, a rectangular shape, a line shape, a cross shape, etc.

The inspection area on the mask is divided into a plurality of strip-shaped stripes by imaginary lines running in the X direction, where the width of each stripe in the Y direction is equal to the scan width W. The pattern on the light amount calibration unit is also divided into the same imaginary stripes as ones which divide the inspection area on the mask. The movement of the stage is controlled so that each stripe is continuously scanned. Thereby an image of the mask and an image of the light amount calibration unit, having the same widths are continuously input to the photodiode array, and then the optical images are generated.

For example, when light amount amplitudes of the respective stripes are monitored from the optical image of the light amount calibration unit and lowering is found in the light amount (output of white level) of the photodiode array, a correcting value (gain) in calibration is set to be large to raise the white level. This may be performed in real time during inspection or it may be performed after the inspection is terminated.

In this embodiment, for example, the light amount calibration circuit can be provided instead of the fluctuation value acquiring circuit 125, the fluctuation value correcting circuit 126, and the map generating circuit 127 shown in FIG. 1. The light amount calibration circuit is connected to the photodiode array. According to this configuration, in the light amount calibration circuit, information can be sent to the control computer 110 so as to monitor the light amount of the optical image focused on the photodiode array and adjust the correcting value in the calibration, if necessary. The control computer 110 can perform calibration to the photodiode array based upon this information.

As described above, in this embodiment, the light amount calibration unit is provided on the stage. Then, the inspection region of the sample to be inspected is virtually divided by a plurality of stripes and the pattern on the light amount calibration unit is also virtually divided by these stripes. When inspection is performed, the stage is moved such that all the stripes of both the inspection region of the sample to be inspected and the light amount calibration unit are continuously scanned. The light amount amplitudes of the respective stripes are monitored based upon the optical image thus obtained. When lowering is found in the light amount (output of white level) of the photodiode array, the correcting value (gain) in calibration is set to be large to raise the white level. Thereby, the accuracy of the inspection is maintained allowing the position errors of the mask pattern to be reduced.

In this embodiment, a combination of the light amount calibration unit and the position error correcting unit of the first embodiment may be utilized.

For example, a white pattern for light amount calibration may be provided on the position error correcting unit of the first embodiment. In this case, the pattern for position error correcting provided on the position error correcting unit can be divided by the same stripes as the plurality of stripes dividing the inspection region of the sample to be inspected. Further, the white pattern can be divided by the same patterns. The stage is moved so that the respective images of the inspection region, the pattern for position error correcting, and the pattern for light amount calibration are continuously acquired. Incidentally, the white stripes are not required to be disposed on the respective stripes necessarily, but they may be disposed alternately, every third stripe, etc.

When the above configuration is adopted, the inspection system has a light amount calibration circuit in addition to the configuration shown in FIG. 1. In this case, the light amount calibration circuit is connected to the photodiode array, and is connected to the control computer 110 via a bus 120 serving as a data transmission path.

According to such an inspection system, the optical images of the inspection region of the sample to be inspected and the position error correcting unit can be obtained by moving the stage so that all the stripes of the inspection region and the position error correcting unit are continuously scanned. After the actually-measured values of the position coordinates of the respective patterns provided on the position error correcting unit are obtained based upon the optical images obtained, fluctuation values of the position coordinates occurring in the inspection process are acquired from a difference between an average value of true values of the position coordinates and an average value of the actually-measured values. Then, when the position coordinates of the patterns of the whole sample to be inspected are corrected using the fluctuation values, the position errors of the patterns occurring in the inspection process can be reduced. Further, a distribution of the position errors of the patterns of the sample to be inspected occurring in the inspection process can be understood by producing a map of the position coordinate fluctuation values on the entire sample to be inspected from the fluctuation values of the position coordinates of the patterns on the sample to be inspected. Further, the light amount amplitudes of the respective stripes are monitored based upon the optical image of the white pattern provided on the position error correcting unit. When lowering occurs in the light amount (output of white level) of the photodiode array, the correcting value (gain) in calibration is set to be large to raise the white level. Thereby, the inspection accuracy is prevented from lowering so that the position errors of the mask patterns can be reduced.

The features and advantages of the present invention may be summarized as follows.

According to the first aspect of the present invention, an inspection system is provided which can reduce position errors occurring in the inspection process.

According to the second aspect of the present invention, an inspection method is provided which can reduce position errors occurring in the inspection process.

The present invention is not limited to the embodiments described above and can be implemented in various modifications without departing from the spirit of the invention.

The above description of the present embodiment has not specified apparatus constructions, control methods, etc. which are not essential to the description of the invention, since any suitable apparatus constructions, control methods, etc. can be employed to implement the invention. Further, the scope of this invention encompasses all pattern inspection systems and pattern inspection methods employing the elements of the invention and variations thereof which can be designed by those skilled in the art.

What is claimed is:

1. An inspection system comprising:
   a stage having a region for placing a sample thereon which has an inspection region virtually divided by a plurality of stripes;
   a position error correcting unit, which is disposed on the stage in a region different from the region for placing the sample, configured to have patterns virtually divided corresponding to the plurality of stripes;
   an optical image acquiring unit configured to irradiate light onto the inspection region of the sample and onto the position error correcting unit, thereby obtaining optical images;
   a reference image producing unit configured to generate reference images from design data of the sample;
   a comparing unit configured to compare the optical images of the sample and the reference images of the sample, and determine that a different value is defective when the difference value by comparison with the optical image and the reference image exceeds a predetermined threshold;
   a fluctuation value acquiring unit configured to acquire fluctuation values of position coordinates of the patterns formed on the position error correcting unit from both the optical image of the position error correcting unit and the reference image of the position error correcting unit; and
   a fluctuation value correcting unit configured to obtain, based upon the fluctuation values, fluctuation values of position coordinates of respective patterns on the inspection region of the sample to be inspected, and to correct the position coordinates of the respective patterns.

2. The inspection system according to claim 1, further comprising a map producing unit for producing a map from the position coordinates of the respective patterns in the inspection region of the sample to be inspected.

3. An inspection method comprising:
   a step of placing a sample to be inspected on a stage on which a position error correcting unit having predetermined patterns is disposed;
   a step of virtually dividing an inspection region of the sample to be inspected by a plurality of stripes and virtually dividing the patterns of the position error correcting unit by a plurality of stripes, and moving the stage such that all the stripes are continuously scanned regarding both the sample to be inspected and the position error correcting unit to acquire optical images of the sample to be inspected and the position error correcting unit;
   a step of producing reference images corresponding to the optical images from design data of the sample to be inspected;
   a step of comparing the optical image of the sample to be inspected and the reference image of the sample to be inspected with each other and making a defect judgment when a difference value between both exceeds a predetermined threshold;
   a step of acquiring fluctuation values of position coordinates of the patterns formed on the position error correcting unit from the optical image of the position error correcting unit and the reference image of the position error correcting unit;
   a step of obtaining, based upon the fluctuation values, fluctuation values of position coordinates of respective patterns in the inspection region of the sample to be inspected to correct the position coordinates; and
   a step of producing a map from the fluctuation values of the position coordinates of the respective patterns in the inspection region of the sample to be inspected.

4. The inspection method according to claim 3, wherein the step of acquiring fluctuation values of position coordinates of the patterns formed on the position error correcting unit from the optical image of the position error correcting unit and the reference image of the position error correcting unit comprises
   a step of obtaining, from true values of the position coordinates of the patterns formed on the position error correcting unit, an average value of the true values of the patterns contained in a predetermined region;
   a step of obtaining actually-measured values of the position coordinates of the patterns formed on the position error correcting unit from the optical image of the position error correcting unit and the reference image of the position error correcting unit and obtaining an average value of actually-measured values of the patterns contained in the predetermined region; and
   a step of acquiring fluctuation values of the position coordinates of the patterns formed on the position error correcting unit from a difference between the average value of the true values and the average value of the actually-measured values.

5. The inspection method according to claim 3, wherein
a white pattern is formed on the position error correcting unit; and
the step of obtaining the optical images consists of irradiating the sample to be inspected and the position error correcting unit with light to focus respective images of the sample to be inspected and the position error correcting unit on an image sensor through an optical unit, and comprises
   a step of obtaining a light amount of an optical image focused on the image sensor from an optical image of the white pattern, and
   a step of performing calibration of the light amount when the light amount lowers from a predetermined value.

* * * * *